(12) United States Patent
Chen et al.

(10) Patent No.: US 10,567,418 B2
(45) Date of Patent: *Feb. 18, 2020

(54) ADDRESSING LOGIN PLATFORM SECURITY RISKS

(71) Applicant: International Business Machines Corporation, Armonk, NY (US)

(72) Inventors: Yi-Chun Chen, Taipei (TW); Zen-Jerr Hong, Taipei (TW); Lin Chung Liang, New Taipei (TW); Min-Tsung Wu, Taipei (TW)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/391,683

(22) Filed: Apr. 23, 2019

(65) Prior Publication Data
US 2019/0253449 A1    Aug. 15, 2019

Related U.S. Application Data

(63) Continuation of application No. 16/205,310, filed on Nov. 30, 2018, now Pat. No. 10,367,847, which is a continuation of application No. 14/992,054, filed on Jan. 11, 2016, now Pat. No. 10,205,737.

(51) Int. Cl.
*H04L 29/06* (2006.01)

(52) U.S. Cl.
CPC ........ *H04L 63/1433* (2013.01); *H04L 63/083* (2013.01)

(58) Field of Classification Search
CPC ............ H04L 63/1433; H04L 63/0815; H04L 63/083; H04L 63/08; G06F 21/41; G06F 21/31

See application file for complete search history.

(56) References Cited

U.S. PATENT DOCUMENTS

| | | | | | |
|---|---|---|---|---|---|
| 6,141,778 | A | * | 10/2000 | Kane | G06F 21/604 726/4 |
| 8,640,231 | B2 | | 1/2014 | Florencio et al. | |
| 8,856,904 | B2 | | 10/2014 | Chougle et al. | |
| 9,065,849 | B1 | * | 6/2015 | Rivera | H04L 63/145 |
| 10,205,737 | B2 | * | 2/2019 | Chen | H04L 63/083 |

(Continued)

OTHER PUBLICATIONS

"Check website or URL/link safety: reports of phishing, hosting malware and viruses, unwanted software, or poor reputation", ScanURL.net, 4 pages, printed on Nov. 3, 2015, Copywrite © 2015 ScanURL.net, <http://scanurl.net/>.

(Continued)

*Primary Examiner* — Maung T Lwin
*Assistant Examiner* — Sanchit K Sarker
(74) *Attorney, Agent, or Firm* — Pooya Shoghi Ghalehshahi; Brian M. Restauro (57) ABSTRACT

A computer-implemented method includes identifying a primary login platform and identifying one or more security developments associated with the primary login platform. The computer-implemented method further includes determining one or more security corrective actions based on the one or more security developments. A corresponding computer program product and computer system are also disclosed.

17 Claims, 5 Drawing Sheets

(56) References Cited

U.S. PATENT DOCUMENTS

| | | | | |
|---|---|---|---|---|
| 2005/0188222 A1* | 8/2005 | Motsinger | G06F 21/316 | 726/5 |
| 2008/0307235 A1 | 12/2008 | Keohane et al. | | |
| 2009/0049524 A1* | 2/2009 | Farrell | G06F 21/6218 | 726/4 |
| 2009/0241173 A1* | 9/2009 | Troyansky | G06F 21/552 | 726/5 |
| 2010/0227611 A1* | 9/2010 | Schmidt | H04W 4/06 | 455/434 |
| 2011/0208992 A1* | 8/2011 | Cohen | H04L 67/20 | 714/2 |
| 2011/0247069 A1* | 10/2011 | Slater | G06F 21/577 | 726/22 |
| 2012/0054847 A1* | 3/2012 | Schultz | G06F 21/33 | 726/9 |
| 2013/0014236 A1 | 1/2013 | Bingell et al. | | |
| 2013/0347003 A1* | 12/2013 | Whitmore | G06Q 10/06 | 718/108 |
| 2014/0201843 A1* | 7/2014 | Hibbert | H04L 63/1433 | 726/25 |
| 2014/0337941 A1 | 11/2014 | Kominar et al. | | |
| 2015/0089585 A1* | 3/2015 | Novack | H04L 63/08 | 726/3 |
| 2015/0319185 A1* | 11/2015 | Kirti | H04L 63/1416 | 726/23 |
| 2015/0350234 A1* | 12/2015 | Reno | H04L 63/1433 | 726/25 |
| 2016/0127931 A1* | 5/2016 | Baxley | G06F 16/285 | 455/67.16 |
| 2016/0196558 A1* | 7/2016 | Mercille | G06Q 20/327 | 705/44 |
| 2016/0294867 A1* | 10/2016 | Tao | G06F 21/55 | |
| 2016/0366134 A1* | 12/2016 | Hughes | H04M 15/00 | |
| 2017/0078310 A1* | 3/2017 | Hunt | H04L 63/1483 | |
| 2017/0149835 A1* | 5/2017 | Mitevski | H04L 63/108 | |
| 2017/0171205 A1* | 6/2017 | Rose | H04L 63/10 | |
| 2017/0187697 A1* | 6/2017 | Li | H04L 63/083 | |
| 2017/0200006 A1* | 7/2017 | Gershoni | G06Q 10/06 | |
| 2017/0201512 A1* | 7/2017 | Chen | H04L 63/083 | |
| 2019/0109873 A1 | 4/2019 | Chen et al. | | |

OTHER PUBLICATIONS

"Change your passwords with a single click", Password Changer, printed on Nov. 3, 2015, 3 pages, © 2015 Dashlane, Inc., <https://www.dashlane.com/passwordchanger>.

"Join the fight against phishing", PhishTank®, printed on Nov. 3, 2015, 1 page, <http://www.phishtank.com/>.

"Method and System for credential classification and reuse within IT systems", An IP.com Prior Art Database Technical Disclosure, Authors et. al.: Disclosed Anonymously, IP.com No. 000206811, IP.com Electronic Publication: May 9, 2011, 5 pages.

"Website Phishing Check", Arul's utilities, printed on Nov. 3, 2015, 2 pages, Copyright © 2000-2015 Arul John, <http://aruljohn.com/phishing.php>.

Appendix P—List of IBM Patents or Patent Applications Treated as Related, Filed herewith, 2 Pages.

\* cited by examiner

| PLATFORM | PASSWORD | S_LEVEL | S_CATEGORY |
|---|---|---|---|
| W1 —— 401 | ABC123 —— 411 | High —— 421 | 1 —— 431 |
| W2 —— 402 | DEF456 —— 412 | Avg —— 422 | 2 —— 432 |
| W3 —— 403 | GHI789 —— 413 | Avg —— 422 | 2 —— 432 |
| W4 —— 404 | ABC123 —— 414 | Low —— 423 | 3 —— 433 |

ADDRESSING LOGIN PLATFORM SECURITY RISKS

BACKGROUND

The present invention relates generally to the field of security of login platforms, and more particularly to determining corrective actions in response to addressing security risks associated with those platforms.

Security risks associated with login platforms may cause substantial damage to individuals and organizations by compromising sensitive information retrievable through those platforms. Developers and users of login platforms continue to face risks and incur costs associated with addressing login platform security risks.

SUMMARY

A computer-implemented method includes identifying a primary login platform and identifying one or more security developments associated with the primary login platform. The computer-implemented method further includes determining one or more security corrective actions based on the one or more security developments. A corresponding computer program product and computer system are also disclosed.

DETAILED DESCRIPTION

Figure 1:
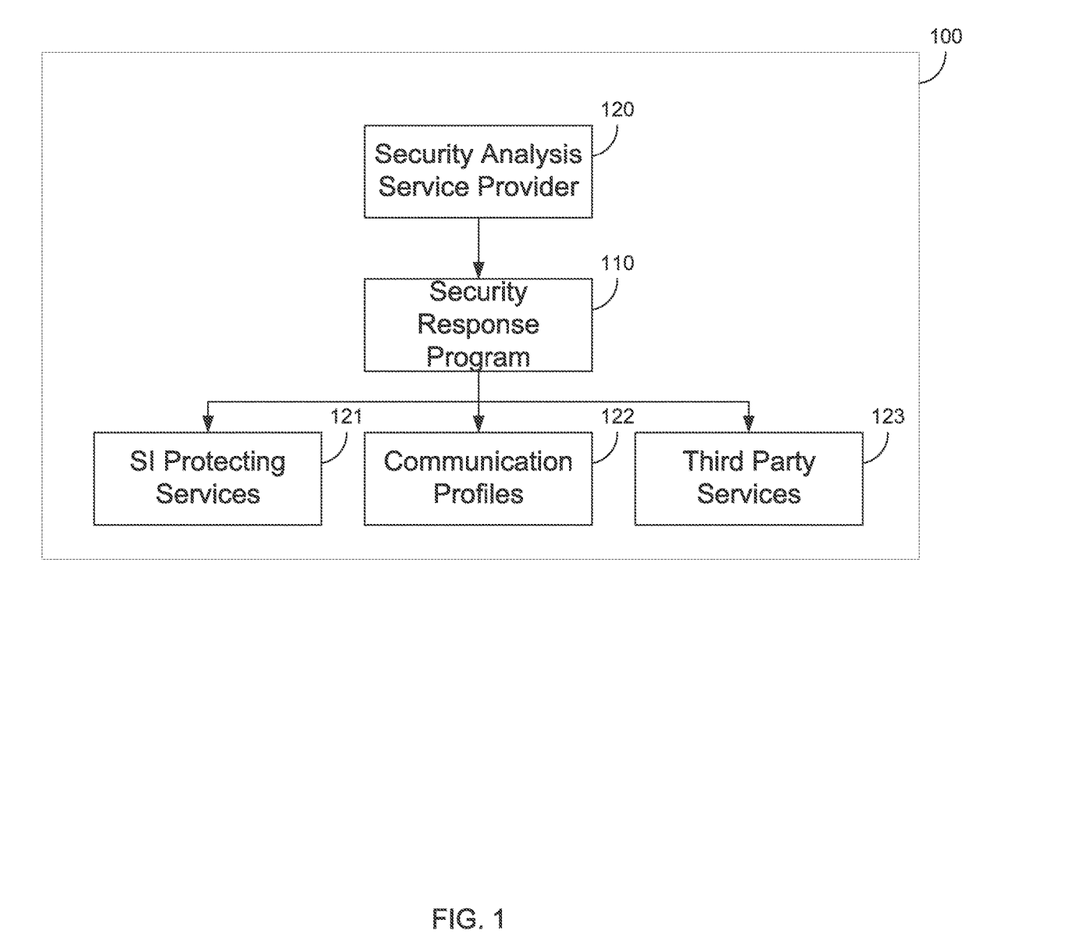
FIG. 1 is a block diagram of one embodiment of a computer system environment suitable for operation of a security response program, in accordance with at least one embodiment of the present invention.

FIG. 1 is a computer system environment 100 suitable for operating a security response program 110, in accordance with at least one embodiment of the present invention. In the computer system environment 100 depicted in FIG. 1, a security analysis service provider 120 (e.g., IBM® XForce and IBM® Trusteer) is any combination of one or more computer (hardware of software) components that, in whole or in part and directly or indirectly, reports zero or more security developments associated with at least one login platform (e.g., at least one website and/or at least one mobile application), and/or assigns a security score to at least one login platform. In at least some embodiments, a security development is any information artefact about one or more (suspected, perceived, and/or actual) security incidents (such as one or more fraud, hacking, or phishing incidents) associated with at least one login platform. In at least some embodiments, a security score associated with a login platform is any measure of the security strength and/or security vulnerability of the login platform, and/or any measure that indicates, in whole or in part and directly or indirectly, at least one information artefact about the security strength and/or security vulnerability of the login platform.

In the computer system environment 100 depicted in FIG. 1, a security analysis service provider 120 provides at least one security information artefact (such as at least one security development and/or at least security score) to the security response program 110. The security response program 110 then determines and performs one or more security corrective actions (i.e., one or more actions determined, directly or indirectly, based on at least one security development and/or at least one security score).

In the computer system environment 100 depicted in FIG. 1, the security response program 110 performs one or more security corrective actions by interacting with one or more sensitive information protecting services 121. Examples of sensitive information protecting services 121 include: services that encrypt and/or hide one or more sensitive information artefacts, services that modify one or more sensitive information artefacts without direct user intervention (e.g., by setting a password to a random string of characters), and services that block access to a user account and/or other login profile for a predetermined period of time (e.g., 24 hours) and/or until further notice. In at least some embodiments, a sensitive information artefact (such as a password) is any information artefact designated as such and/or any information artefact whose access in at least at one time and under at least one set of one or more conditions is limited to only some members of the public (e.g., the authorized users of a user account and/or other login profile).

In the computer system environment 100 depicted in FIG. 1, the security response program 110 performs one or more security corrective actions by interacting with one or more communication profiles 122. In at least some embodiments, a communication profile associated with an entity or group of entities is any one or more information artefacts that are noted as providing a way to contact, communicate with, and/or notify the entity or group of entities in at least one time and under at least one set of one or more conditions. Examples of communication profiles 122 include: communication profiles associated with at least one authorized user of a user account and/or other login profile and communication profiles associated with at least one third party entity (i.e., any entity who is not an authorized user of a user account and/or other login profile, such as a law enforcement entity).

In the computer system environment 100 depicted in FIG. 1, the security response program 110 performs one or more security corrective actions by interacting with one or more third party services 123. Examples of third party services include: financial institution servers, law enforcement agency servers, security analysis service providers 120, automatic security response systems, etc. In some embodiments, the security response program 110 communicates with one or more financial institution servers to cancel one or more financial accounts (e.g., one or more credit card accounts), such as one or more financial accounts associated with a user account and/or other login profile about whom one or more information artefacts is obtained from at least one security analysis service provider 120.

Figure 2:
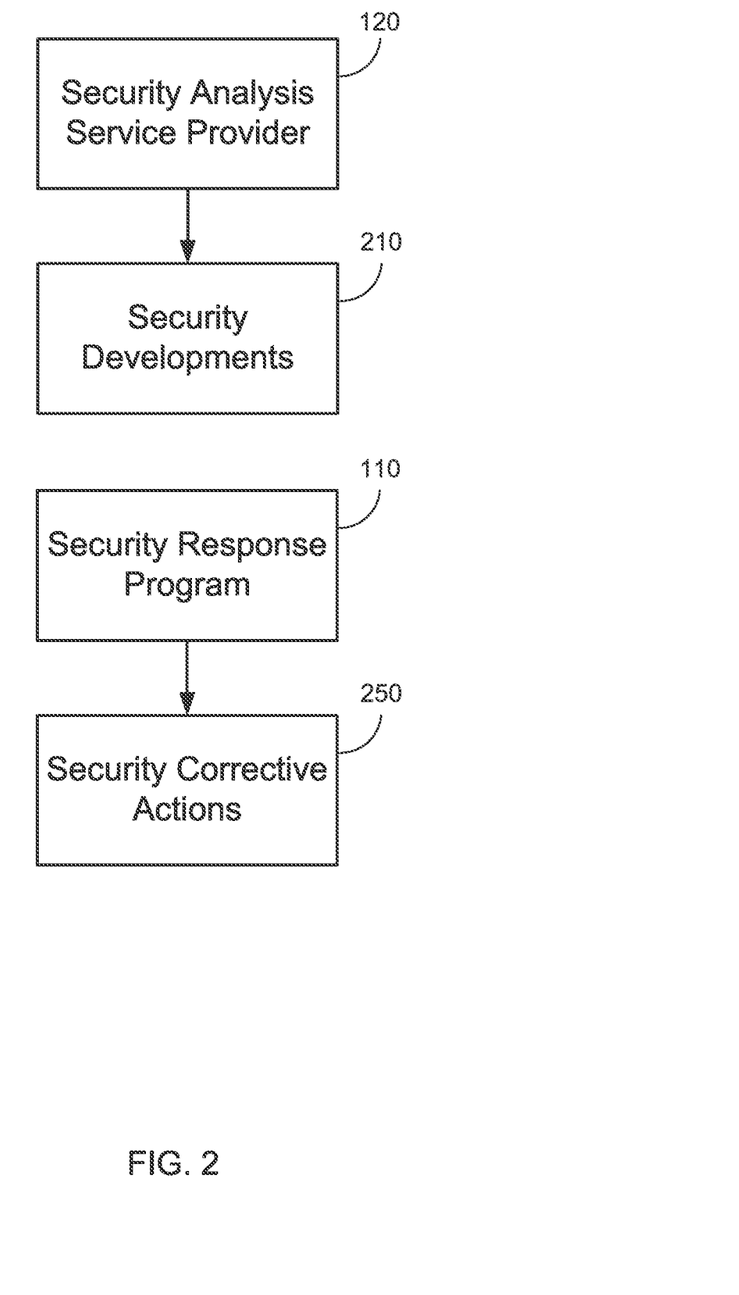
FIG. 2 is a data-flow diagram of a security response program, in accordance with at least one embodiment of the present invention.

FIG. 2 is a data flow diagram of a security response program 110, in accordance with at least one embodiment of the present invention. In the embodiment depicted in FIG. 2, a security analysis service provider 120 provides one or more security developments 210 (as defined above) to the security response program 110. The security response program 110 determines one or more security corrective actions

250. In some embodiments, a security development 210 is determined based on an information artefact denoting that (e.g., with a predefined level of certainty, such as 90% certainty) a login platform has a particular security score.

Figure 3:
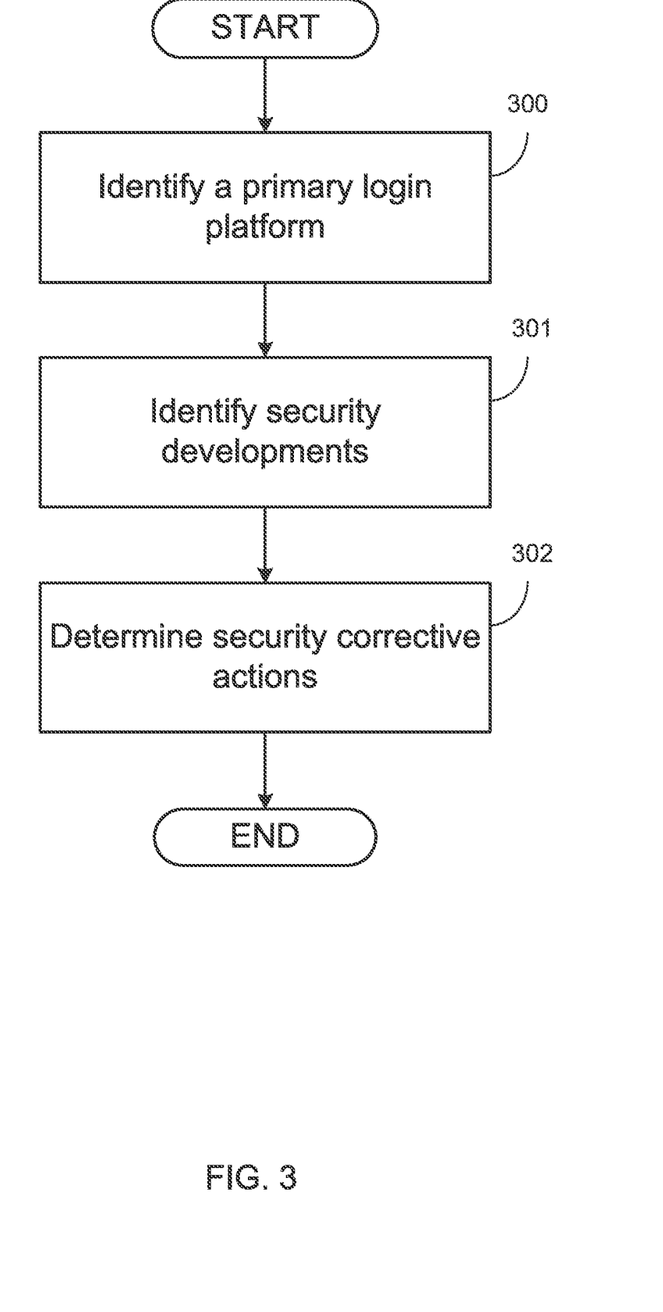
FIG. 3 is a flow-chart diagram of a security response program, in accordance with at least one embodiment of the present invention.

FIG. 3 is a flow-chart diagram of a security response program, in accordance with at least one embodiment of the present invention. At step 300, the program identifies a primary login platform (such as a website or mobile application). At step 301, the program identifies one or more security developments associated with the primary login platform. At step 302, the program determines one or more security corrective actions based on the one or more security developments. In at least some embodiments, a primary login platform is any login platform that, directly or indirectly, receives at least one indication associated with at least one sensitive information artefact.

In some embodiments, the security response program performs at least one of the one or more security corrective actions. In some embodiments, identifying the one or more security developments comprises determining the one or more security developments. In some embodiments, identifying the one or more security developments comprises monitoring one or more performance metrics and/or one or more security criteria associated with the primary login platform. In some embodiments, identifying the one or more security developments comprises accessing at least one security analysis service provider at predefined regular intervals (e.g., once every hour).

In some embodiments, the one or more security developments comprise at least one security incident selected from the group consisting of: (i) an increase in a security risk measure associated with the primary login platform exceeding a predefined security risk increase threshold (e.g., a decrease in a security score associated with the primary login platform exceeding a threshold of 10% decrease); (ii) a number of hacking incidents associated with the primary login platform exceeding a predefined hacking risk threshold (e.g., a threshold of more than one suspected hacking incident associated with the primary login platform in the last 12 months, where a security incident such as a hacking, fraud, or phishing incident is deemed to be suspected if it is confirmed and/or it is reported and/or determined to have a level of certainty exceeding a predefined certainty threshold, such as a 90% certainty); (iii) a number of fraud incidents associated the primary login platform exceeding a predefined fraud risk threshold (e.g., a threshold of more than one suspected fraud incident associated with the primary login platform in the last 24 months); and (iv) a number of phishing incidents associated with the primary login platform exceeding a predefined phishing risk threshold (e.g., a threshold of more than two suspected phishing incident associated with the primary login platform in the last 12 months).

In some embodiments, determining the one or more security corrective actions comprises determining at least one of at least one notifying action or at least one preventive action. In some of those embodiments, the at least one notifying action comprises sending at least one notification via at least one communication profile associated with the primary login platform (such as at least one communication profile associated with at least one authorized user of the primary login platform and/or at least one communication profile associated with at least one third party service associated with the primary login platform); and the at least one preventive action is selected from the group consisting of: (i) automatically changing one or more sensitive information artefacts associated with the login platform; and (iv) initiating at least one financial account suspending process.

In some embodiments, identifying the one or more security developments comprises identifying one or more sensitive information databases and receiving a primary sensitive information artefact associated with the primary login platform. Identifying the one or more security developments further comprises determining whether one or more matching sensitive information artefacts match the primary sensitive information artefact, where the one or more matching sensitive information artefacts are stored in at least one of the one or more sensitive information databases and each of the one or more matching sensitive information artefacts is associated with a matching login platform. Identifying the one or more security developments further comprises, responsive to the one or more matching sensitive information artefacts matching the primary sensitive information artefact, determining a security divergence factor between the primary login platform and each matching login platform based on at least one of one or more security levels associated with each of the primary login factor and each matching login platform and one or more security categories associated with each of the primary login factor and each the matching login platform. Identifying the one or more security developments further comprises determining whether the security divergence factor exceeds a predefined security divergence threshold (e.g., a 10% divergence threshold).

In at least some embodiments, a security divergence factor between two or more login platforms is any indication of the exact or estimated (e.g. with a particular level of certainty, such as 90% certainty) difference in at least one security-related value (such as at least one security level and/or at least one security category) between the two or more login platforms. In at least some embodiments, a security level associated a login platform is any exact or estimated (e.g. with a particular level of certainty, such as 95% certainty) and direct or indirect measure of the security of a login platform. In at least some embodiments, a security category associated with a login platform is any exact or estimated (e.g. with a particular level of certainty, such as 98% certainty) and direct or indirect indication of association of a login platform with zero or more login platforms based at least in part on a knowledge, an understanding and/or an estimation of the security of the login platforms in the security category.

In at least some of those embodiments, the security response program determines one or more security developments based on whether: (i) one or more received sensitive information artefacts (e.g., one or more sensitive information artefacts entered by the user) associated with the primary login platform match one or more matching sensitive information artefacts associated with at least one matching login platform, and (ii) a divergence factor determined based on at least one of the security category or security level of the primary login platform and each of the one or more matching login platforms (e.g., the divergence between at least one of the security category or security level of the primary login platform and each of the one or more matching login platforms) exceeds a predefined security divergence threshold.

In some embodiments, determining whether the one or more matching sensitive information artefacts match the primary sensitive information artefact comprises retrieving at least one of the one or more sensitive information databases. In some embodiments, receiving the primary sensitive information artefact comprises interacting with the primary login platform. In some embodiments, determining the security divergence factor comprises determining a security level divergence factor (i.e., indicating the divergence between a numeric value denoting the security level associated with the primary login platform and a numeric value denoting the security level associated with each of the one or more matching login platforms) and determining a security category divergence factor (i.e., indicating the divergence between a numeric value denoting the security category associated with the primary login platform and a numeric value denoting the security category associated with each of the one or more matching login platforms). In some of those embodiments, determining whether the security divergence factor exceeds the predefined security divergence threshold comprises determining that the security divergence factor exceeds the predefined security divergence threshold if at least one of the following conditions is true: (i) the security level divergence factor exceeds a predefined security level divergence threshold (e.g., a 7% divergence threshold) or (ii) the security category divergence factor exceeds a predefined security category divergence threshold (e.g., a 5% divergence threshold).

In some embodiments, the predefined security divergence threshold is determined based on at least one of one or more primary properties associated with the primary login platform and one or more matching properties associated with each of the one or more matching login platforms. In some embodiments, at least one of the predefined security divergence threshold, the predefined security level divergence threshold, or the predefined security category divergence threshold is determined based on at least one of one or more primary properties associated with the primary login platform and one or more matching properties associated with each of the one or more matching login platforms. In some embodiments, the one or more sensitive information databases comprise at least one password table.

Figure 4:
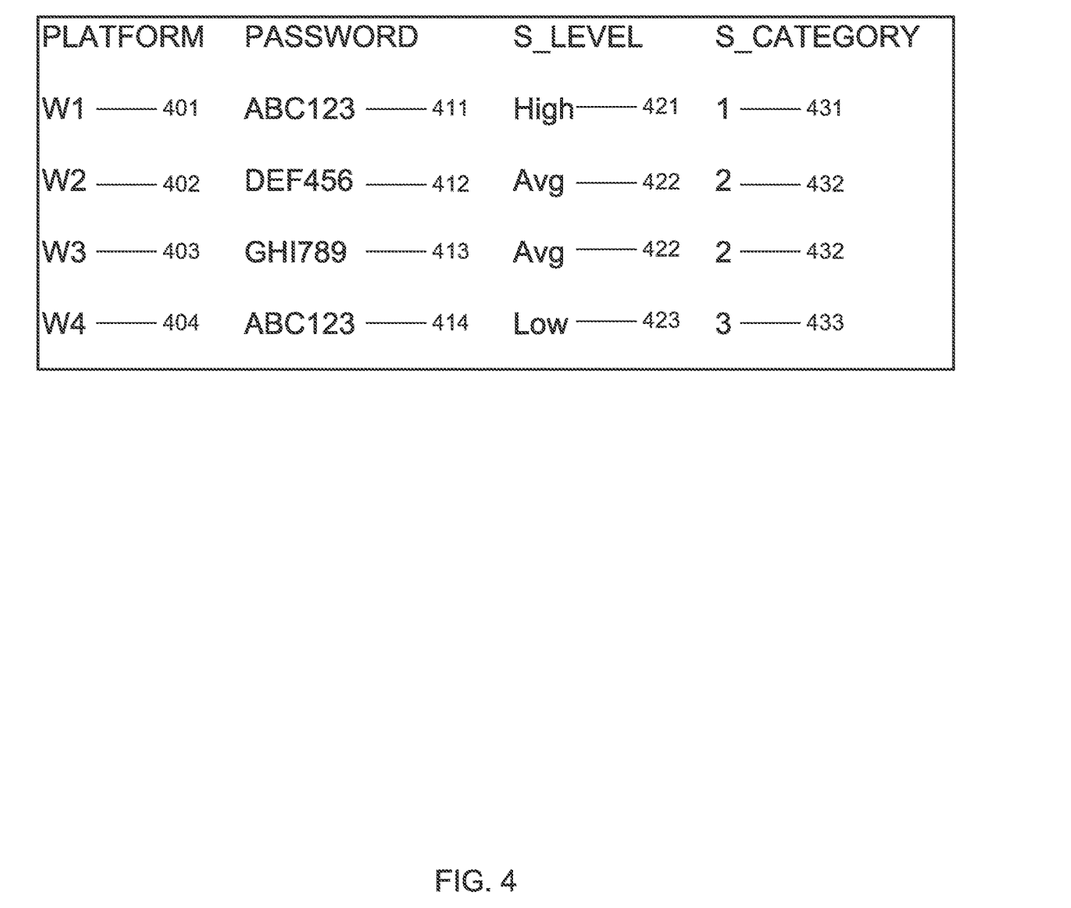
FIG. 4 depicts data for an operational example of a password table, in accordance with at least one embodiment of the present invention.

FIG. 4 depicts data for an operational example of a password table, in accordance with at least one embodiment of the present invention. In the embodiment depicted in FIG. 4, login platform W1 401 is associated with the password ABC123 411, a "High" security level 421, and a security category of 1 431. Login platform W2 402 is associated with password DEF456 412, an "Avg" security level 422 (denoting an average security level), and a security category of 2 432. Login platform W3 403 is associated with password GHI789 413, an "Avg" security level 422, and a security category of 2 432. Login platform W4 404 is associated with ABC123 411 (similar to login platform W1 401), a "Low" security level 423, and a security category of 3 433.

In the embodiment depicted in FIG. 4, login platforms W1 401 and W4 404 share a common password, ABC123 411. In some embodiments, the security response program determines a security divergence factor between the two login platforms based on at least one of their respective security levels (i.e., a "High" security level 421 associated with login platform W1 401 and a "Low" security level 423 associated with login platform W4 404) or security categories (i.e., a security category of 1 431 associated with login platform W1 401 and a security category of 3 433 associated with login platform W4 404). In some embodiments, the program determines whether the determined divergence factor exceeds a predefined security divergence threshold.

In general, one or more steps of different embodiments of the security response program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the security response program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

In at least some embodiments, phishing is any computer user activity that comprises at least one attempt to masquerade as at least one primary login platform and/or as at least one communication from at least one primary login platform (e.g., with the intention of obtaining at least one sensitive information artefact). In at least some embodiments, computer fraud is any computer user activity that comprises at least one attempt to misrepresent at least one fact to at least one other person made for monetary or personal gain and/or made with deceptive intent (e.g., made through misappropriating a login platform and/or through services associated with a login platform, such as a newsletter). In at least some embodiments, hacking is any computer activity that comprises at least one attempt to access a computer system and/or computer network in an unauthorized manner and/or through exploitation of a weakness in the computer system and/or computer network.

Aspects of the present invention allow for dynamically and proactively monitoring security developments and safeguarding sensitive information in response to those developments even without user action. Nevertheless, the aforementioned advantages are not required to be present in all of the embodiments of the invention and may not be present in all of the embodiments of the invention.

Figure 5:
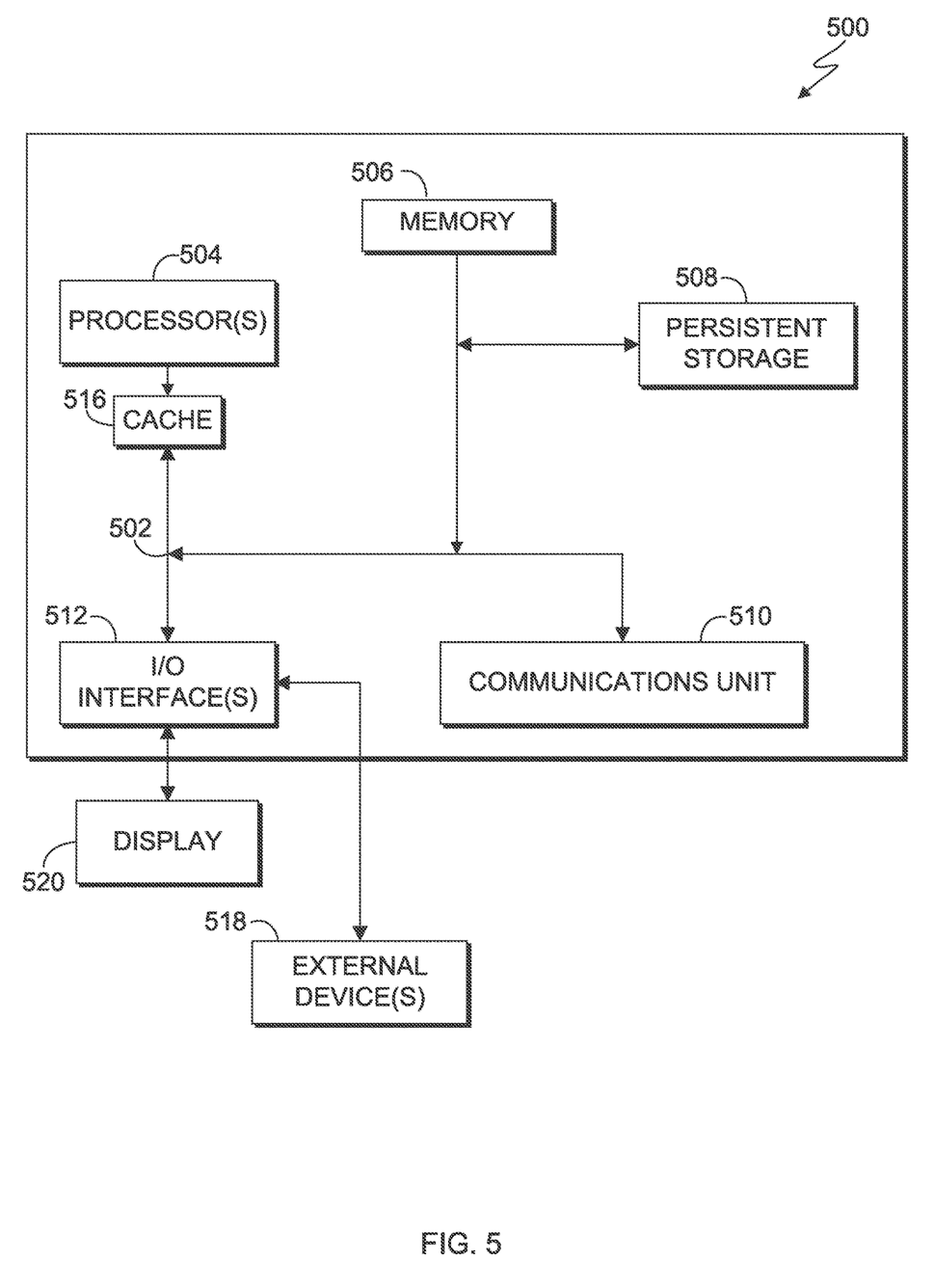
FIG. 5 is a block diagram of a computing apparatus suitable for executing a security response program, in accordance with at least one embodiment of the present invention.

FIG. 5 is a block diagram depicting components of a computer 500 suitable for executing the security response program. FIG. 5 displays the computer 500, the one or more processor(s) 504 (including one or more computer processors), the communications fabric 502, the memory 506, the RAM, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the security response program may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The security response program may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying suspected fraudulent attempts being associated with a primary login platform by determining whether one or more matching sensitive information artefacts match a primary sensitive information artefact of a matching login platform;
   responsive to the one or more matching sensitive information artefacts matching the primary sensitive information artefact, determining a security divergence factor between the primary login platform and each of the matching login platforms based on at least one of one or more security levels associated with each of the primary login factor and each of the matching login platforms and one or more security categories associated with each of the primary login factor and each of the matching login platform; and
   responsive to identifying the one or more security developments, automatically updating the security credentials of the user to decrease the access level, increasing the security category for the primary login platform, and modifying one or more sensitive information artefacts associated with the primary login platform for the user, wherein identifying said one or more security developments comprises accessing at least one security analysis service provider at predefined regular intervals.

2. The computer-implemented method of claim 1, wherein said one or more security developments comprise at least one security incident selected from the group consisting of:
   an increase in a security risk measure associated with said primary login platform exceeding a predefined security risk increase threshold;
   a number of hacking incidents associated with said primary login platform exceeding a predefined hacking risk threshold;
   a number of fraud incidents associated with said primary login platform exceeding a predefined fraud risk threshold; and
   a number of phishing incidents associated with said primary login platform exceeding a predefined phishing risk threshold.

3. The computer-implemented method of claim 1, wherein the security credentials of the user indicate an access level for the user and security category for the primary login platform.

4. The computer-implemented method of claim 1, further comprising: performing at least one of said one or more security corrective actions.

5. The computer-implemented method of claim 1, further comprising:
   determining at least one of at least one notifying action or at least one preventive action.

6. The computer-implemented method of claim 5, wherein:
   said at least one notifying action comprises sending at least one notification via at least one communication profile associated with said primary login platform; and
   said at least one preventive action is selected from the group consisting of:
     automatically changing one or more sensitive information artefacts associated with said login platform; and
     initiating at least one financial account suspending process.

7. A computer program product comprising:
   one or more computer readable storage device and program instructions stored on the one or more computer readable storage device, the program instructions comprising:
   program instructions to identify suspected fraudulent attempts being associated with a primary login platform by determining whether one or more matching sensitive information artefacts match a primary sensitive information artefact of a matching login platform;
   program instructions to, responsive to the one or more matching sensitive information artefacts matching the primary sensitive information artefact, determine a security divergence factor between the primary login platform and each of the matching login platforms based on at least one of one or more security levels associated with each of the primary login factor and each of the matching login platforms and one or more security categories associated with each of the primary login factor and each of the matching login platform; and program instructions to responsive to identifying the one or more security developments, automatically updating the security credentials of the user to decrease the access level, increase the security category for the primary login platform, and modifying one or more sensitive information artefacts associated with the primary login platform for the user, wherein the program instructions to identify said one or more security developments comprises accessing at least one security analysis service provider at predefined regular intervals.

8. The computer program product of claim 7, wherein said one or more security developments comprise at least one security incident selected from the group consisting of:
   an increase in a security risk measure associated with said primary login platform exceeding a predefined security risk increase threshold;
   a number of hacking incidents associated with said primary login platform exceeding a predefined hacking risk threshold;
   a number of fraud incidents associated with said primary login platform exceeding a predefined fraud risk threshold; and
   a number of phishing incidents associated with said primary login platform exceeding a predefined phishing risk threshold.

9. The computer program product of claim 7, wherein the security credentials of the user indicate an access level for the user and security category for the primary login platform.

10. The computer program product of claim 7, wherein the program instructions stored on the computer readable storage device further comprise:
   program instructions to perform at least one of said one or more security corrective actions.

11. The computer program product of claim 7, wherein the program instructions stored on the computer readable storage device further comprise:
   program instructions to determine at least one of at least one notifying action or at least one preventive action.

12. The computer program product of claim 11, wherein:
   said at least one notifying action comprises sending at least one notification via at least one communication profile associated with said primary login platform; and
   said at least one preventive action is selected from the group consisting of:
      program instructions to automatically change one or more sensitive information artefacts associated with said login platform; and
      program instructions to initiate at least one financial account suspending process.

13. A computer system comprising:
   one or more computer processors;
   one or more computer readable storage device; and
   program instructions stored on the one or more computer readable storage device for execution by at least one of the one or more computer processors, the program instructions comprising:
   program instructions to identify suspected fraudulent attempts being associated with a primary login platform by determining whether one or more matching sensitive information artefacts match a primary sensitive information artefact of a matching login platform;
   program instructions to, responsive to the one or more matching sensitive information artefacts matching the primary sensitive information artefact, determine a security divergence factor between the primary login platform and each of the matching login platforms based on at least one of one or more security levels associated with each of the primary login factor and each of the matching login platforms and one or more security categories associated with each of the primary login factor and each of the matching login platform; and
   program instructions to responsive to identifying the one or more security developments, automatically updating the security credentials of the user to decrease the access level, increase the security category for the primary login platform, and modifying one or more sensitive information artefacts associated with the primary login platform for the user, wherein the program instructions to identify said one or more security developments comprises accessing at least one security analysis service provider at predefined regular intervals.

14. The computer system of claim 13, wherein said one or more security developments comprise at least one security incident selected from the group consisting of:
   an increase in a security risk measure associated with said primary login platform exceeding a predefined security risk increase threshold;
   a number of hacking incidents associated with said primary login platform exceeding a predefined hacking risk threshold;
   a number of fraud incidents associated with said primary login platform exceeding a predefined fraud risk threshold; and
   a number of phishing incidents associated with said primary login platform exceeding a predefined phishing risk threshold.

15. The computer system of claim 13, wherein the security credentials of the user indicate an access level for the user and security category for the primary login platform.

16. The computer system of claim 13, wherein the program instructions stored on the computer readable storage device further comprise:
   program instructions to perform at least one of said one or more security corrective actions.

17. The computer system of claim 13, wherein the program instructions stored on the computer readable storage device further comprise:
   program instructions to determine at least one of at least one notifying action or at least one preventive action.

* * * * *